United States Patent

Lim

[11] Patent Number: 5,512,160
[45] Date of Patent: Apr. 30, 1996

[54] NICKEL-CADMIUM BATTERY ACTIVATION PROCESS

[75] Inventor: Hong S. Lim, Agoura Hills, Calif.

[73] Assignee: Hughes Aircraft Company, Los Angeles, Calif.

[21] Appl. No.: 513,645

[22] Filed: Aug. 10, 1995

[51] Int. Cl.$^6$ .................................................. H01M 10/44
[52] U.S. Cl. ................................................ 205/61; 429/52
[58] Field of Search ........................ 205/60, 61, 62, 205/57, 67; 429/52, 49, 50, 51, 223, 222; 320/14, 21

[56] References Cited

U.S. PATENT DOCUMENTS

| | | | |
|---|---|---|---|
| 4,680,241 | 7/1987 | Dyer | 429/49 |
| 5,334,226 | 8/1994 | Furukawa | 205/60 X |
| 5,356,732 | 10/1994 | Terasaka et al. | 429/52 |
| 5,405,714 | 4/1995 | Terasaka et al. | 429/52 |

*Primary Examiner*—Anthony Skapars
*Attorney, Agent, or Firm*—Elizabeth E. Leitereg; T. Gudmestad; W. K. Denson-Low

[57] ABSTRACT

A nickel-cadmium cell is activated by means of a formation cycling process in which electrolyte is partially removed and replenished between cycles and the ultimate electrolyte level is controlled by centrifugation following cycling.

18 Claims, 4 Drawing Sheets

NICKEL-CADMIUM BATTERY ACTIVATION PROCESS

BACKGROUND OF THE INVENTION

This invention relates generally to nickel-cadmium storage batteries and more particularly to a process for activating nickel-cadmium cells during their manufacturing process.

Nickel-cadmium (Ni/Cd) batteries are important energy storage devices having many uses including use in communication satellites. In the manufacture of such batteries, it is necessary to activate the nickel-cadmium cell by means of adding a known amount of electrolyte to dry battery cells and repetitive charging and discharging cycles prior to use, a process which has become known as formation cycling. In general, the electrolyte used is an aqueous solution of about 20% to 40% by weight of potassium hydroxide. In addition, in the manufacture of hermetically sealed batteries, it is important that the correct quantity of liquid electrolyte be added to each cell. Overfilling a nickel-cadmium cell, for example, even by a small amount, will cause oxygen pressure build-up due to blockage of pores in the separator by the excess amount of electrolyte. The open pores are needed for oxygen gas passage from the nickel electrode to the cadmium electrode where the oxygen is recombined with charged cadmium. The oxygen gas is evolved at the nickel electrode during the charge half-cycle as a normal parasitic reaction. Such recombination is essential if the build-up of excessive gas pressure within the battery and permanent damage are to be avoided. Underfilling the cell is likewise undesirable since underfilling can result in high internal resistance, reduced cell capacity, and reduced battery service life.

Typical present day nickel-cadmium batteries have separators made from either nylon or polypropylene felt material. In the manufacturing process for such batteries, overfilling of a cell, either by a mistake in estimating the quantity of electrolyte required or by a manufacturing accident, can only be corrected by a laborious process of inverting the battery cells and then charging them in the inverted position whereupon, under the force of gravity, the excess electrolyte flows out through a fluid fill tube of the battery.

Recently, nickel-cadmium batteries of an improved design have been introduced. In these batteries, sometimes referred to as "super" nickel-cadmium batteries, the previously used felt separators have been replaced by a zirconia separator material. However, because of the stronger capillary action exhibited by the zirconia separators, the above-mentioned technique for correcting the overfilling problem has not been found to be effective.

The presently used cell activation technique of adding a known amount of electrolyte to a dry cell has a serious disadvantage in that any impurity—for example, carbonate—introduced into the cell during the dry cell manufacturing steps cannot be removed from the cells as part of the activation process, since the electrolyte cannot be easily removed once it is introduced into the cell.

Another problem arising in the use of present day nickel-cadmium batteries is an observed reduction in cell capacity over a period of storage time. This phenomenon is known as capacity fading.

A principal object of the present invention is to reduce capacity fading of such batteries on storage.

Another object of the present invention is to provide a process which will enable the controlled removal of excess electrolyte from nickel-cadmium batteries and especially from super nickel-cadmium batteries employing separators exhibiting strong capillary action.

Another object of the present invention is to provide a means of flushing the cell with an excess amount of electrolyte and finally leaving the cell with a fresh portion of electrolyte as part of the activation process.

Another object of the present invention is to improve the cell capacity of nickel-cadmium storage batteries.

Other objects and advantages of the present invention will become apparent from the following detailed disclosure and description.

SUMMARY OF THE INVENTION

The present invention provides a novel process for activating nickel-cadmium battery cells by a combination of adding an excess amount of electrolyte, electrical cycling, and partially removing electrolyte. The activation process of this invention includes the steps of:

(a) cycling the cell a multiplicity of times in an electrolyte flooded condition;

(b) partially replenishing the cell with fresh electrolyte during each cycle except the last cycle; and (c) removing excess electrolyte to a predetermined volume of electrolyte during the last cycle.

This process has several advantages over the activation processes used at present.

More particularly, the process of the present invention includes the steps of:

(a) providing a nickel-cadmium cell with an excess of electrolyte;

(b) cycling a multiplicity of times by alternately charging and discharging the cell;

(c) partially removing excess electrolyte and introducing a fresh batch of electrolyte several times (e.g., four times) after each period of several cycles (e.g., seven cycles) except the last cycle;

(d) removing excess electrolyte to a predetermined electrolyte level following the last cycle; and (e) setting a predetermined amount of overcharge protection by overdischarging the cell at a cell voltage below 0.0 V.

"Overcharge protection" means leaving a quantity of cadmium hydroxide uncharged after full charge of the positive electrode to avoid evolution of hydrogen as the reaction product of the overcharge reaction of the cadmium electrode.

Excess electrolyte preferably is partially removed by means of a vacuum and is removed to a predetermined level by means of centrifugation. The process of the present invention results in improved cell capacity and eliminates the capacity fading ordinarily observed in the use of nickel-cadmium cells which have been activated in accordance with previously known formation cycling methods.

BRIEF DESCRIPTION OF THE DRAWINGS

The various features and advantages of the present invention may be more readily understood with reference to the following detailed description taken in conjunction with the accompanying drawing figures wherein like reference numerals designate like structural elements, and in which.

DETAILED DESCRIPTION

Figure 1:
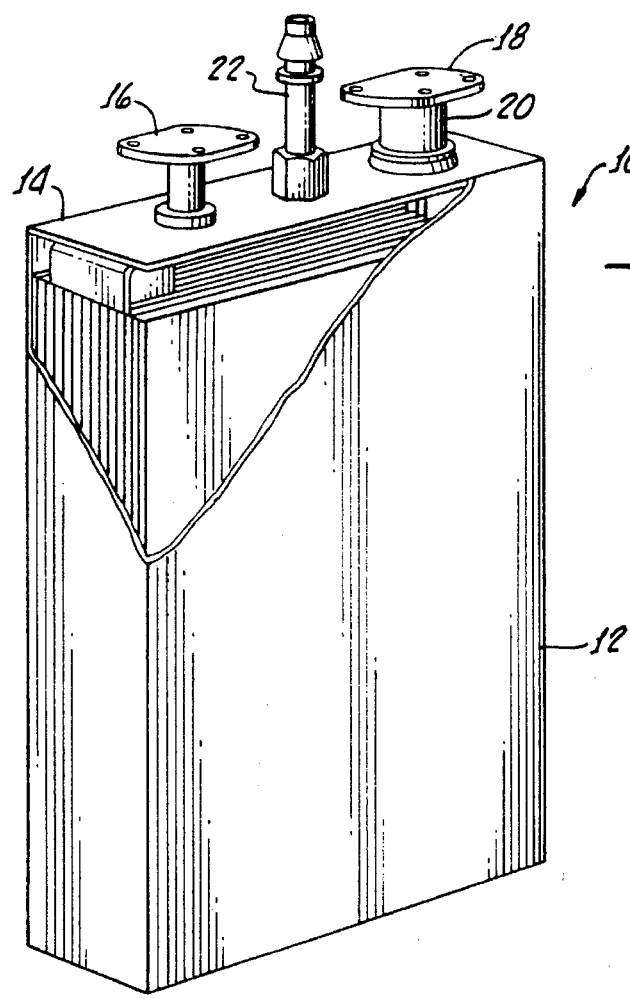
FIG. 1 is a perspective view of a nickel-cadmium cell in which the cell activation process of the present invention may be employed, with the case partially broken away.

A typical nickel-cadmium battery cell is shown in FIG. 1. A nickel-cadmium battery cell 10 comprises a case 12 which completely encloses the active and structural elements of the battery cell therein. A cover 14 has terminal posts 16 and 18. Terminal post 16 is the negative terminal and is connected to the cover. Terminal post 18 is the positive terminal and is mounted on an insulating bushing 20 so that terminal post 18 passes through cover 14 and is insulated with respect thereto. An electrolyte fill tube 22 is connected to an opening in cover 14 and is used to fill electrolyte into the battery.

Figure 2:
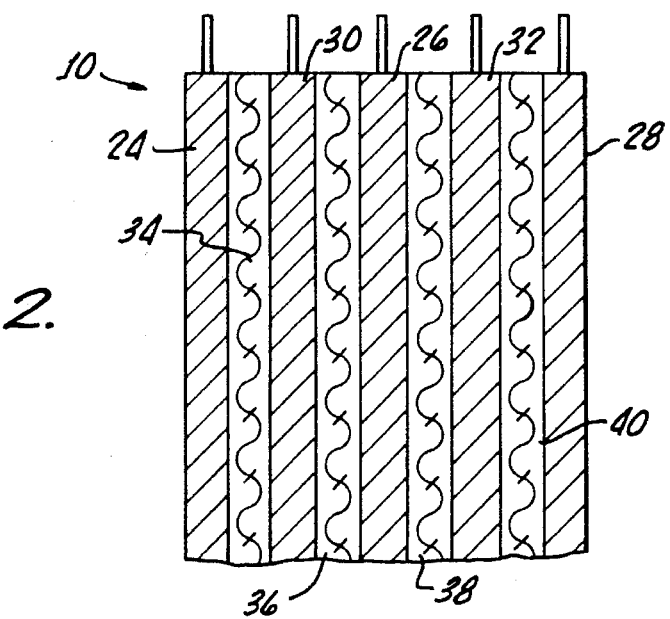
FIG. 2 is an enlarged side elevational view of the cell stack with the cell case broken away, showing some of the battery plates and the separators between the battery plates.

As shown in FIG. 2, there is a plurality of battery electrodes 24, 26, 28, 30, and 32 and separators 34, 36, 38 and 40 within case 12 of battery cell 10. The negative electrodes are made of cadmium active material and the positive electrodes are made of nickel active material. The electrodes are preferably embedded in nickel sinter plates. The electrolyte generally used is a potassium hydroxide solution with or without additives. Part of the stack of electrodes making up battery cell 10 is shown in FIG. 2. Negative electrodes 24, 26, and 28 are shown separated from alternate positive electrodes 30 and 32 by means of separators 34, 36, 38, and 40 positioned between the electrodes.

Nickel-cadmium battery cells must undergo a process of cell activation prior to use. A typical state-of-the-art process consists of the following steps:

1) a predetermined amount of 28–33% KOH solution is injected into a dry cell made up of fully-discharged nickel and cadmium electrodes;

2) the cell is cycled by consecutively charging and discharging for approximately 14 cycles; and 3) a desired level of precharge is set by overcharging the cell, while a predetermined amount of oxygen is vented out of the cell. The precharge level represents the amount of undischarged cadmium metal left when the nickel electrode is fully discharged.

In order to insure proper cell operation for long cycle life, it is necessary to prevent oxygen evolution from the cadmium electrode during overdischarge of the cell, since oxygen evolution irreversibly damages the cadmium electrode. To prevent oxygen evolution, an excess amount of charged cadmium (cadmium metal) is needed after full discharge of the nickel electrode, so that the cadmium can continuously discharge without oxygen evolution, while the nickel electrode is overdischarged. This excess cadmium metal is called "precharge". In order to ensure proper cell operation for long cycle life, it is also necessary to prevent hydrogen evolution from the cadmium electrode during overcharge of the cell. This is because the hydrogen does not recombine rapidly and causes a semipermanent pressure build-up in the cell. To prevent hydrogen evolution, an excess amount of discharged cadmium (cadmium hydroxide) is needed after full charge of the nickel electrode, so that the cadmium hydroxide can be continuously charged without hydrogen evolution, while the nickel electrode is overcharged. This excess cadmium hydroxide is called "overcharge protection". To provide appropriate amounts of precharge and overcharge protection, the capacity of the cadmium electrode should be considerably larger than the capacity of the nickel electrode.

The cell reaction can be illustrated as follows:

Positive Electrode:

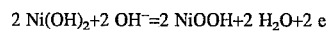
$$2\ Ni(OH)_2 + 2\ OH^- = 2\ NiOOH + 2\ H_2O + 2\ e$$

Negative Electrode:

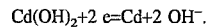
$$Cd(OH)_2 + 2\ e = Cd + 2\ OH^-.$$

The overall cell reaction is:

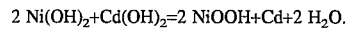
$$2\ Ni(OH)_2 + Cd(OH)_2 = 2\ NiOOH + Cd + 2\ H_2O.$$

Overcharge or side reactions include:

Positive Electrode:

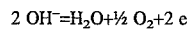
$$2\ OH^- = H_2O + \tfrac{1}{2}\ O_2 + 2\ e$$

Negative Electrode:

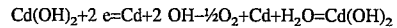
$$Cd(OH)_2 + 2\ e = Cd + 2\ OH^- - \tfrac{1}{2}O_2 + Cd + H_2O = Cd(OH)_2$$

One of the problems of nickel-cadmium cells which are activated by the above-described procedure is cell capacity fading on storage. Cells so activated may lose as much as about 20% of the initial cell capacity after storage for several weeks. Although the exact cause of cell capacity fading is poorly understood, it has been suspected that impurities present in the cell may play a role. Because the amount of electrolyte added to the cell prior to activation is limited and the electrolyte remains in the cell for the entire life of the cell, the effects of impurities may be more pronounced than if a larger amount of electrolyte were used to flush out the cell and dilute the impurities present in the cell.

Use of the battery activation process of the present invention has resulted, surprisingly, in the elimination of capacity fading. The process is easier to use and more reliable because it does not require measurement of a volume of gas, as does the prior art procedure, but merely requires measurement of battery charge. Furthermore, the present invention makes unnecessary a cumbersome "FCT" or Flooded Cycle Test. The FCT step, which involves cycling a stack of nickel and cadmium electrodes in a flooded pool of electrolyte, is required for state-of-the-art cells to ensure that both nickel and cadmium electrodes are washed free of carbonate, conditioned, and fully discharged when the cell stack is assembled.

Figure 3:
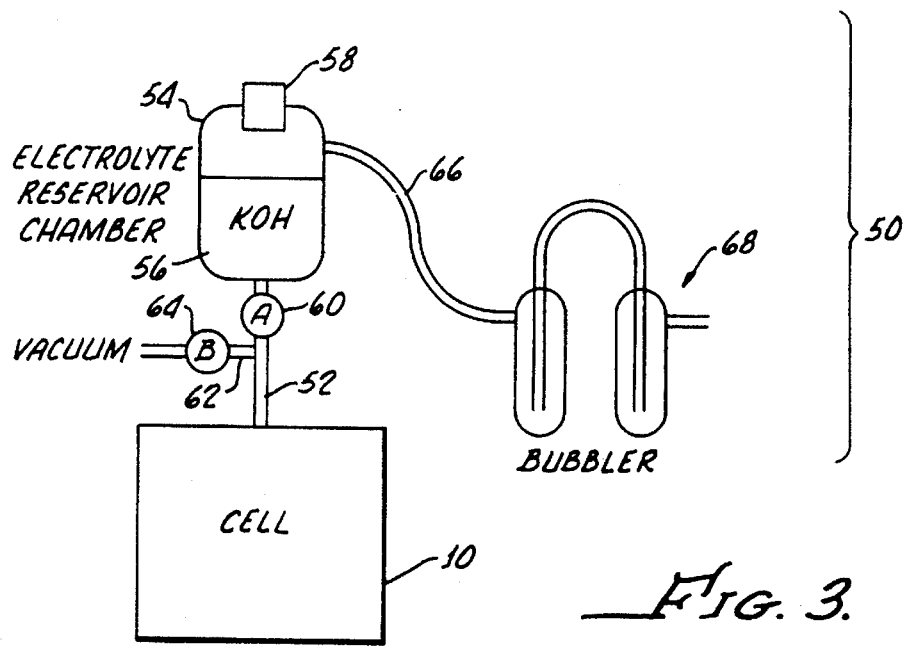
FIG. 3 illustrates a cell activation apparatus having an external electrolyte reservoir, which is useful for practicing the process of the present invention.

The cell activation process of the present invention will be described using the cell activation apparatus shown in FIG. 3. Referring to FIG. 3, wherein is shown a nickel-cadmium cell activation apparatus 50, a nickel-cadmium cell 10 is connected by means of an electrolyte fill tubing 52 with an electrolyte reservoir chamber 54 above cell 10, which chamber contains an excess amount of electrolyte 56 and has a cap 58. Tubing 52 is equipped with a valve 60 for opening or closing the conduit between chamber 54 and cell 10. A vacuum line 62 is connected to tubing 52 below valve 60 and is equipped with a valve 64. A gas removal line 66 is connected to the upper part of chamber 54 and to a bubbler 68 for removing excess gas from chamber 54.

The process of cell activation is conducted as follows: Electrolyte 56 is added to electrolyte reservoir chamber 54 with cap 58 open and valves 60 and 64 closed, after evacuation of cell 10 through vacuum line 62. Valve 60 is opened to allow a large excess of electrolyte to flow from chamber 54 through tubing 52 into cell 10, achieving a flooded condition. While valve 60 is left open, cell 10 is cycled a number of times by alternate charging and discharging at a rate between about $1/10$ C and C, the rate C being defined as the rate of charge at which the cell is fully charged from a fully discharged state in one hour, or vice versa. Electrolyte in cell 10 is partially flushed by electrolyte 56 in chamber 54 because oxygen evolved from cell 10 during the charge half-cycle pushes some of the electrolyte out of pores in the electrode stack and out of cell 10, while some of the fresh electrolyte goes into cell 10 and the pores during the discharge half-cycle when no gas is evolved. Then, valve 60 is closed and electrolyte 56 in chamber 54 is emptied. While cell 10 is held upside down, valve 64 is opened to apply a vacuum to cell 10 causing part of the electrolyte to be removed. Valve 64 is then closed, cell 10 is put right-side up, chamber 54 is filled with fresh electrolyte, valve 60 is opened, and fresh electrolyte is added to again flood cell 10. This procedure is repeated several times, for example, four to six times; and then, instead of opening valve 64 to remove electrolyte from cell 10 by vacuum, the electrolyte level in cell 10 is adjusted to a predetermined level, for example, approximately 2.5 ml to 4.5 ml of electrolyte per ampere hour of cell capacity, by placing the cell in a centrifuge which is rotated at the velocity necessary to give the desired g-level to remove a predetermined quantity of electrolyte from the cell, for example, about 10 g to 30 g. Following this adjustment of the electrolyte level, a predetermined level of overcharge protection is applied to the cell by overdischarging the cell to the desired charge level. Overdischarging can be conveniently accomplished at a rate below the rate used for charging and discharging the cell, preferably between about $1/30$ C and $1/2$ C.

This overdischarging will create an excess of cadmium hydroxide (overcharge protection) in the cadmium electrode in a quantity corresponding to the amount of overdischarge over the nickel electrode capacity, while an equivalent amount of hydrogen is evolved from the nickel electrode. The hydrogen which is evolved will escape the cell. The amount of precharge, which is equal to cadmium electrode capacity less nickel electrode capacity less overcharge protection, will be set automatically.

The invention will be better understood by reference to the following examples which are intended to be illustrative and not unduly limiting to the scope of the present invention, which is defined in the claims appended hereto.

The following example illustrates the increased initial capacity of Ni/Cd cells activated according to the process of the present invention compared to Ni/Cd cells activated according to the state-of-the-art process described above and the outstanding post-storage capacities of such cells.

EXAMPLE 1

Four approximately 20-Ah (ampere hour) Ni/Cd cells were filled with an excess of 28% potassium hydroxide solution and cycled seven times using a 150-minute charge at the $1/2$ C rate, followed by discharge at the $1/2$ C rate to 0.5 V. After every seven cycles, part of the excess electrolyte was removed by evacuation and fresh electrolyte was added to chamber 54. After the twenty-eighth cycle, electrolyte was removed and the electrolyte level adjusted to approximately 4.0–4.4 ml of electrolyte per Ah of capacity by centrifuging at 20–30 g.

Approximately 7 Ah of overcharge protection was set by overdischarging the cells at the $1/10$ C rate to below cell voltage of 0.0 V. The cell capacities were measured initially and at the end of a four-week discharged open circuit storage at 20° C.

Figure 4:
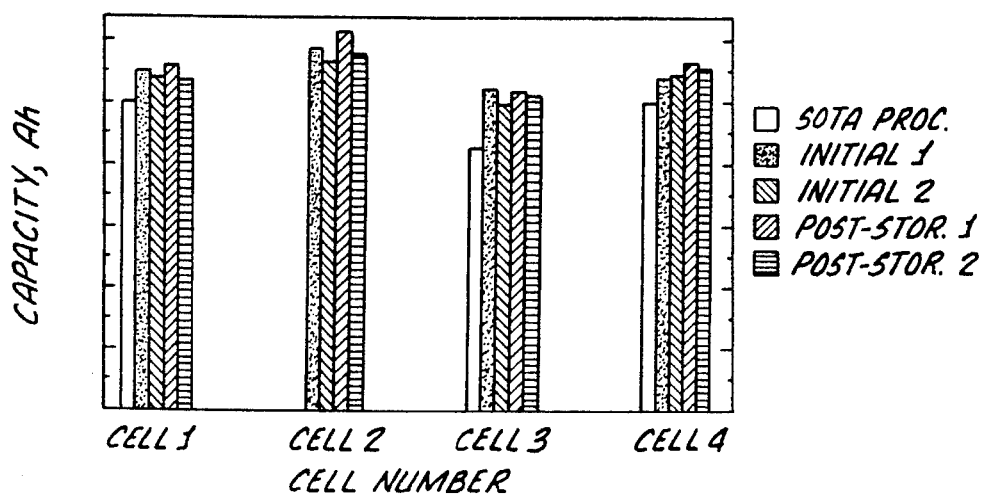
FIG. 4 is a graph of the initial and post-storage capacities of four different cells activated by the activation process of the present invention compared to cells activated by a previously used process.

The results obtained are shown in the bar graphs of FIG. 4, wherein the first bar in each group represents the initial capacity of sister cells from the same cell lot activated by the state-of-the-art process described above. The second and third bars represent duplicate initial capacities for cells activated according to this invention, and the fourth and fifth bars represent duplicate post-storage capacities for the same cells after an open circuit storage period of four weeks.

It can be seen that the initial cell capacities for cells activated according to the present invention are higher than those for cells using a state-of-the-art cell activation process. It can also be seen that capacity fading after four weeks' storage is either negligible or nonexistent.

The following example illustrates the effect of long-term storage upon the cell capacities of Ni/Cd cells activated in accordance with the process of the present invention.

EXAMPLE 2

Figure 5A:
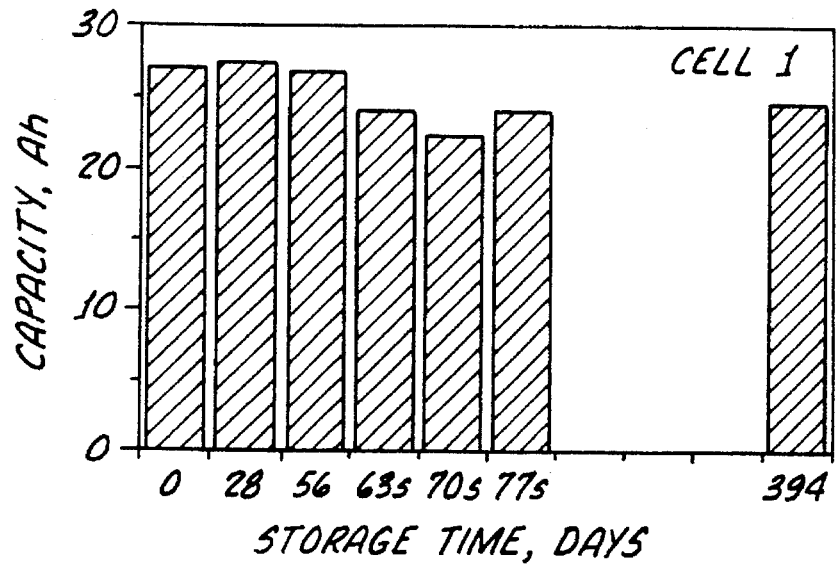
FIGS. 5a, 5b, 5c and 5d are graphs of storage capacities of four cells activated by the activation process of the present invention. Data in these graphs show that practically no capacity fading occurred between 77-day and 399-day storage periods.
Figure 5B:
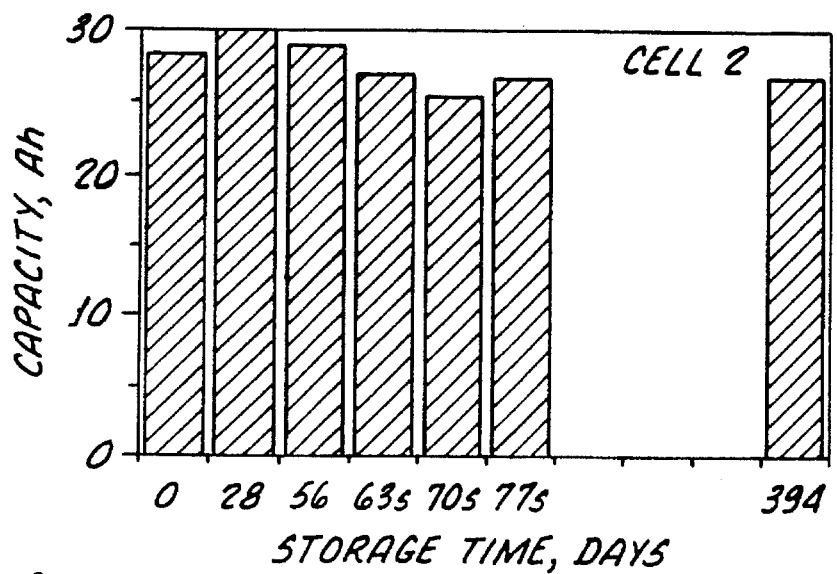
Figure 5C:
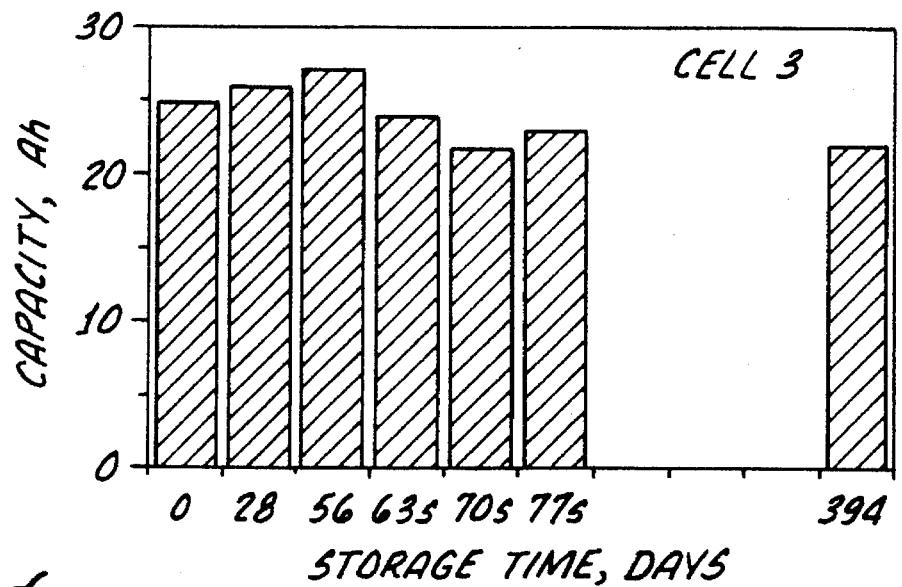
Figure 5D:
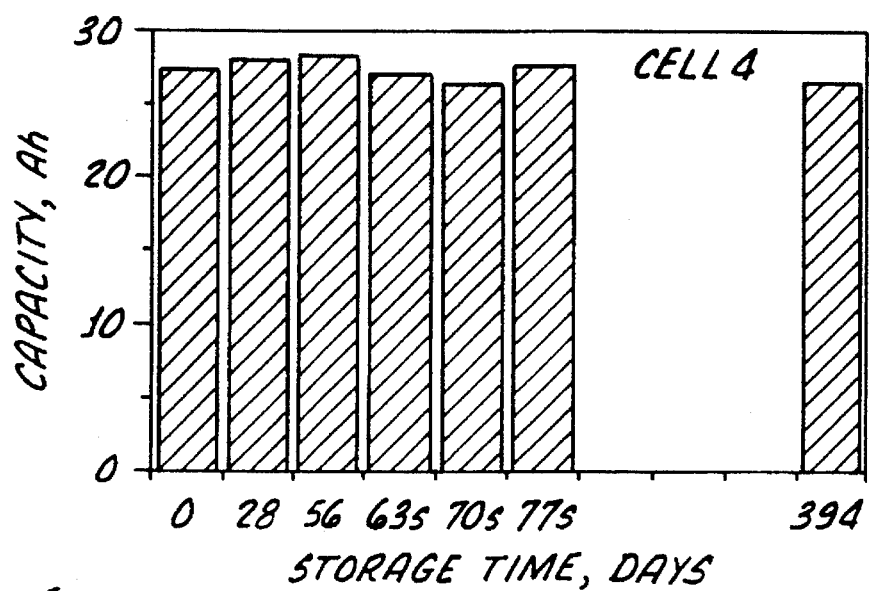

The storage test was continued, using the four super Ni/Cd cells of Example 1. The cell capacities were measured at various intervals up to 77 days and then again after about one year (317 days). Measurements were made upon cells stored in discharged open circuit condition except for the 63-, 70- and 77-day periods when the cells were in shorted condition. The results are shown in FIGS. 5a, 5b, 5c and 5d. FIGS. 5a, 5b and 5d show measured capacities of 21-Ah super Ni/Cd cells and FIG. 5c shows measured capacities of a 19-Ah super Ni/Cd cell.

The results show that capacity fading for Ni/Cd cells activated using the process of the present invention is negligible even after about a year's storage, especially considering the rated (name plate) capacities of 21 Ah and 19 Ah.

Having thus described exemplary embodiments of the present invention, it will be understood by those skilled in the art that the within disclosures are exemplary only and that the present invention is only limited by the following claims.

What is claimed is:

1. A process for activating a nickel-cadmium cell comprising:

cycling the cell a multiplicity of times in an electrolyte flooded condition;

partially replenishing the cell with fresh electrolyte during each cycle except the last cycle; and removing excess electrolyte to a predetermined volume of electrolyte during the last cycle.

2. The process of claim 1 wherein said electrolyte is an aqueous solution of about 20% to 40% by weight of potassium hydroxide.

3. The process of claim 1 wherein the removal of electrolyte to a predetermined volume is accomplished by means of centrifugation.

4. A process for activating a nickel-cadmium cell comprising:
   (a) providing a nickel-cadmium cell with an excess of electrolyte;
   (b) cycling a multiplicity of times by alternately charging and discharging said cell;
   (c) partially removing excess electrolyte and introducing a fresh batch of electrolyte periodically at an interval of predetermined number of cycles except the last cycle;
   (d) following the last cycle, removing excess electrolyte to a predetermined electrolyte level; and
   (e) setting overcharge protection by overdischarging the cell at a cell voltage below 0.0 V.

5. The process of claim 4 wherein said electrolyte is an aqueous solution of about 20% to 40% by weight of potassium hydroxide.

6. The process of claim 4 wherein said step of removing excess electrolyte to a predetermined electrolyte level is accomplished by means of centrifugation.

7. The process of claim 4 wherein said predetermined electrolyte level is approximately 2.5 ml to 4.5 ml of electrolyte per ampere hour of cell capacity.

8. The process of claim 6 wherein said centrifugation is accomplished at about 10 g to 30 g.

9. A process for activating a nickel-cadmium cell comprising the steps of:
   (a) providing a nickel-cadmium cell with an excess of electrolyte;
   (b) cycling said cell for a predetermined number of cycles at a rate between about $1/10$ C and C, the rate C being defined as the rate of charge at which the cell is fully charged from a fully discharged state in one hour;
   (c) discharging said cell at the same rate to about 0.5 V;
   (d) partially removing excess electrolyte;
   (e) introducing fresh electrolyte;
   (f) repeating steps (b) to (e) a multiplicity of times;
   (g) following step (f), repeating steps (b) and (c) and then adjusting the electrolyte level to a predetermined electrolyte level; and
   (h) setting a predetermined level of overcharge protection by overdischarging said cell at a rate between about $1/30$ C and $1/2$ C at a cell voltage below 0.0 V.

10. The process of claim 9 wherein said electrolyte is an aqueous solution of about 20% to 40% by weight of potassium hydroxide.

11. The process of claim 9 wherein the rate of charging and discharging said cell is about $1/2$ C.

12. The process of claim 9 wherein steps (b) to (e) are repeated four to six times.

13. The process of claim 9 wherein the partial removal of excess electrolyte in step (d) is accomplished by means of a vacuum.

14. The process of claim 9 wherein step (g) is accomplished by centrifugation.

15. The process of claim 9 wherein said predetermined electrolyte level is approximately 2.5 ml to 4.5 ml of electrolyte per ampere hour of cell capacity.

16. The process of claim 14 wherein said centrifugation is accomplished at about 10 g to 30 g.

17. The process of claim 9 wherein the rate of overdischarging said cell in step (h) is about $1/10$ C.

18. The process of claim 9 wherein said predetermined level of overcharge protection is approximately 7 ampere hours.

* * * * *